(12) United States Patent
Hirazumi

(10) Patent No.: US 12,371,045 B2
(45) Date of Patent: Jul. 29, 2025

(54) DRIVING ASSISTANCE APPARATUS

(71) Applicant: SUBARU CORPORATION, Tokyo (JP)

(72) Inventor: Kyosuke Hirazumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 18/329,746

(22) Filed: Jun. 6, 2023

(65) Prior Publication Data

US 2023/0399005 A1 Dec. 14, 2023

(30) Foreign Application Priority Data

Jun. 14, 2022 (JP) ................................. 2022-095888

(51) Int. Cl.
*B60W 50/14* (2020.01)
*B60W 30/045* (2012.01)
*B60W 40/103* (2012.01)
*B60W 40/114* (2012.01)
*B60W 50/00* (2006.01)

(52) U.S. Cl.
CPC .......... *B60W 50/14* (2013.01); *B60W 30/045* (2013.01); *B60W 40/103* (2013.01); *B60W 40/114* (2013.01); *B60W 2050/0083* (2013.01); *B60W 2520/14* (2013.01); *B60W 2540/106* (2013.01); *B60W 2540/18* (2013.01)

(58) Field of Classification Search
CPC .. B60W 50/14; B60W 30/045; B60W 40/103; B60W 40/114; B60W 2050/0083; B60W 2520/14; B60W 2540/106; B60W 2540/18

USPC ......................................................... 340/439
See application file for complete search history.

(56) References Cited

U.S. PATENT DOCUMENTS

| | | | |
|---|---|---|---|
| 6,024,182 A * | 2/2000 | Hamada | B60K 6/365 903/910 |
| 6,219,610 B1 * | 4/2001 | Araki | B60T 8/1755 701/72 |
| 11,364,895 B2 * | 6/2022 | Su | B60W 40/109 |

(Continued)

FOREIGN PATENT DOCUMENTS

| | | |
|---|---|---|
| JP | 2017-061251 A | 3/2017 |
| JP | 2019-166998 A | 10/2019 |
| WO | 2012/114382 A1 | 8/2012 |

*Primary Examiner* — Naomi J Small
(74) *Attorney, Agent, or Firm* — Rimon P.C.

(57) ABSTRACT

A driving assistance apparatus to be mounted on a vehicle includes an outwardly headed state detection unit, a target accelerator operation amount setting unit, and an information presentation unit. The outwardly headed state detection unit makes a detection of an outwardly headed state in which the vehicle is cornering with a yaw rate and a slip angle of a vehicle body having a same sign. The target accelerator operation amount setting unit sets, in response to the detection of the outwardly headed state, a target accelerator operation amount so that a difference between a driving force on the front wheel caused by an output of the travel power source and an absolute value of a braking force on the front wheel caused by internal circulation torque of a transfer is reduced. The information presentation unit presents the driver with information regarding the target accelerator operation amount.

9 Claims, 7 Drawing Sheets

(56) References Cited

U.S. PATENT DOCUMENTS

| | | | |
|---|---|---|---|
| 2008/0086251 A1* | 4/2008 | Lu | B60T 8/1755 |
| | | | 701/70 |
| 2013/0090810 A1* | 4/2013 | Yoshimoto | B60T 8/17552 |
| | | | 701/41 |
| 2013/0245945 A1 | 9/2013 | Morita et al. | |
| 2018/0118220 A1* | 5/2018 | Kimura | B60W 10/20 |
| 2018/0208184 A1* | 7/2018 | Sugai | B60L 15/2009 |
| 2019/0293172 A1* | 9/2019 | Shinohara | B60K 17/02 |
| 2021/0240192 A1* | 8/2021 | Zhang | G05D 1/0891 |

* cited by examiner

FIG. 2A OUTWARDLY HEADED STATE

FIG. 2B INWARDLY HEADED STATE

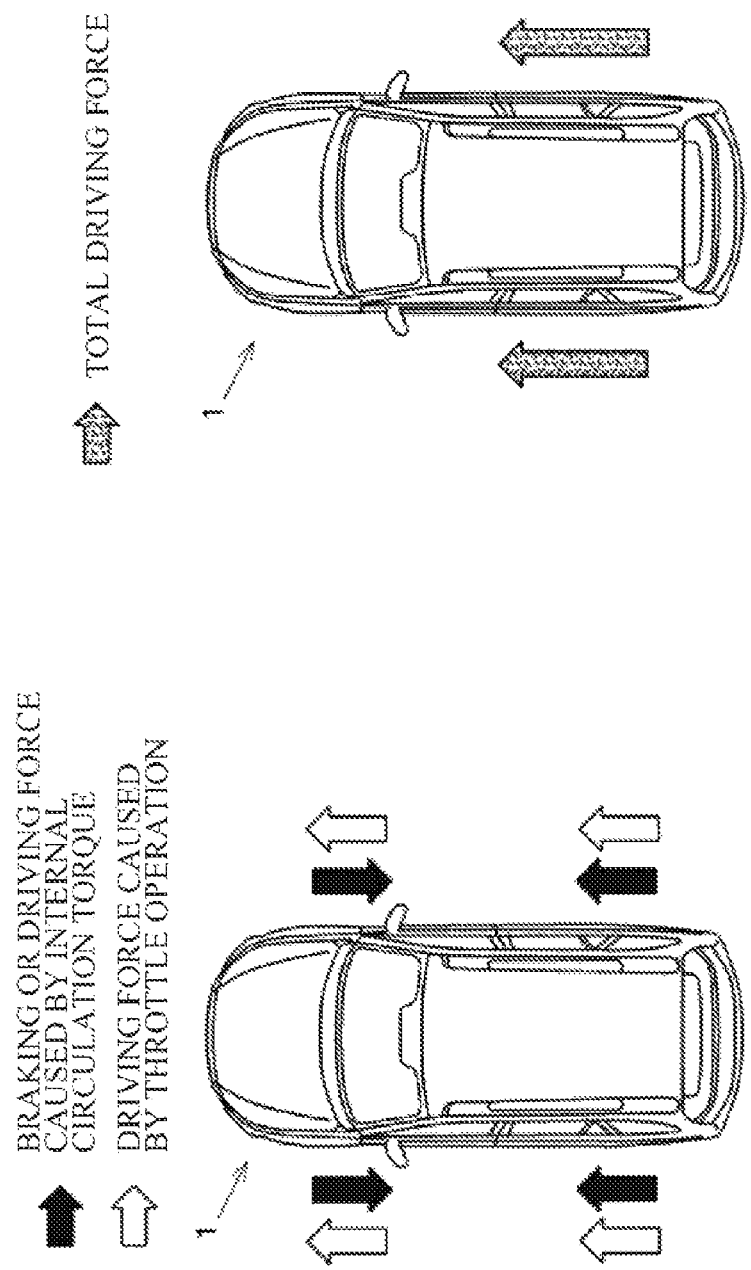

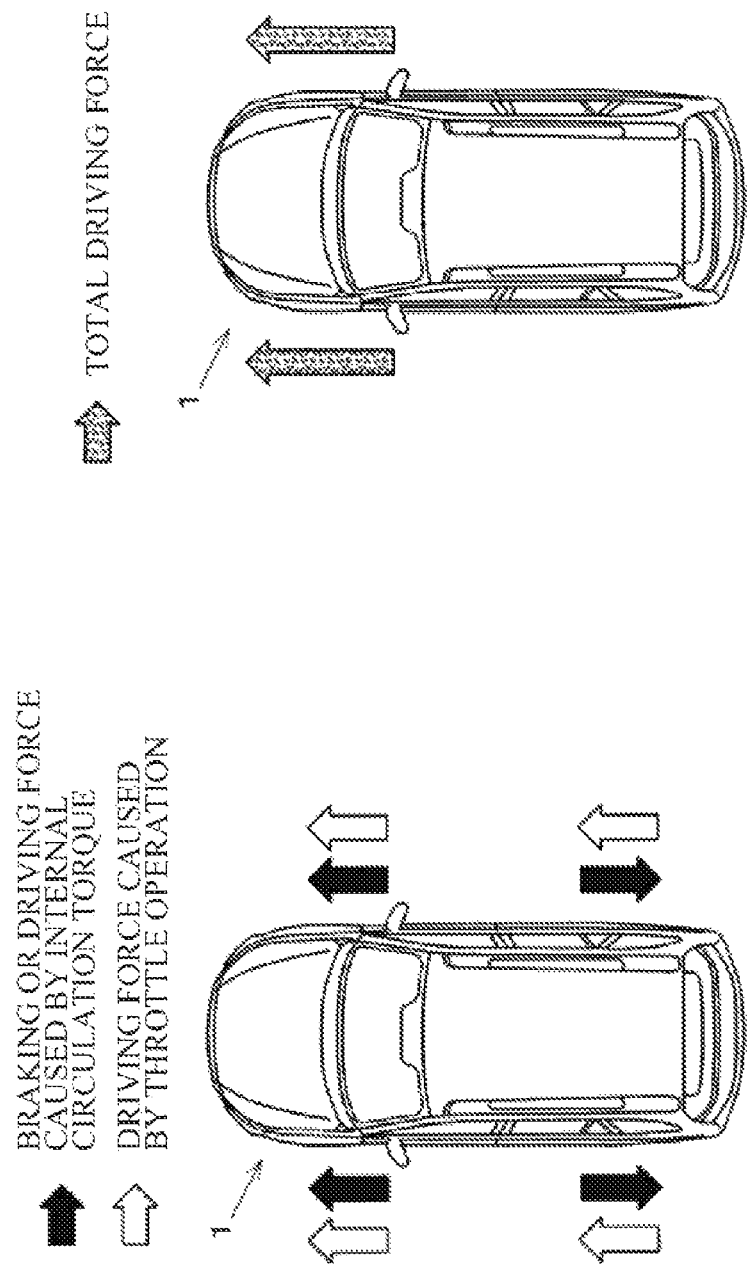

DRIVING ASSISTANCE APPARATUS

CROSS-REFERENCE TO RELATED APPLICATIONS

The present application claims priority from Japanese Patent Application No. 2022-095888 filed on Jun. 14, 2022, the entire contents of which are hereby incorporated by reference.

BACKGROUND

The disclosure relates to a driving assistance apparatus that presents a driver who drives a vehicle with a target accelerator operation amount when cornering.

As a technique related to operation such as controlling an automobile when cornering, for example, Japanese Unexamined Patent Application Publication (JP-A) No. 2017-061251 discloses a vehicle posture control apparatus that, to suppress understeer or tack-in caused by an accelerator operation during cornering, generates a target yaw moment based on deviation between a reference yaw rate and an actual yaw rate, and applies a braking or driving force for achievement of the target yaw moment to each of wheels.

JP-A No. 2017-061251 also discloses determining an oversteer state or an understeer state, based on information on a vehicle behavior such as the yaw rate, the yaw rate deviation, a vehicle speed, or a lateral acceleration rate.

JP-A No. 2019-166998 discloses an all-wheel-drive vehicle control apparatus that, when a steering wheel is turned in a coasting state in which an accelerator is off, applies hydraulic pressure to a reverse brake included in a forward and reverse switching mechanism when a first condition and a second condition both hold, to prevent noise from being caused by a gear of a drive system without reducing hydraulic pressure, i.e., an engagement force, of a transfer clutch. The first condition is a condition that torque related to a reduction drive gear is substantially zero, and the second condition is a condition that torque related to a reduction driven gear is substantially zero.

JP-A No. 2019-166998 includes description of internal circulation torque exchanged between front wheel side and rear wheel side through the transfer clutch, based on differential rotation between front and rear wheels.

As a technique related to presentation of information to a driver during traveling, International Publication No. WO 2012/114382 discloses a navigation apparatus that calculates a recommended speed of a vehicle based on road situation information indicating a road situation.

SUMMARY

An aspect of the disclosure provides a driving assistance apparatus to be mounted on a vehicle. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes an outwardly headed state detection unit, a target accelerator operation amount setting unit, and an information presentation unit. The outwardly headed state detection unit is configured to make a detection of an outwardly headed state in which the vehicle is cornering with a yaw rate and a slip angle of a vehicle body of the vehicle having a same sign. The target accelerator operation amount setting unit is configured to set, in response to the detection of the outwardly headed state, a target accelerator operation amount so that a difference between a driving force on the front wheel caused by an output of the travel power source and an absolute value of a braking force on the front wheel caused by internal circulation torque of the transfer is reduced. The information presentation unit is configured to present the driver with information regarding the target accelerator operation amount.

An aspect of the disclosure provides a driving assistance apparatus to be mounted on a vehicle. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes an inwardly headed state detection unit, a target accelerator operation amount setting unit, and an information presentation unit. The inwardly headed state detection unit is configured to make a detection of an inwardly headed state in which the vehicle is cornering with a yaw rate and a slip angle of a vehicle body of the vehicle having different signs. The target accelerator operation amount setting unit is configured to set, in response to the detection of the inwardly headed state, a target accelerator operation amount so that a difference between a driving force on the rear wheel caused by an output of the travel power source and an absolute value of a braking force on the rear wheel caused by internal circulation torque of the transfer is reduced. The information presentation unit is configured to present the driver with information regarding the target accelerator operation amount.

An aspect of the disclosure provides a driving assistance apparatus to be mounted on a vehicle. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes circuitry and an information presentation device. The circuitry is configured to: make a detection of an outwardly headed state in which the vehicle is cornering with a yaw rate and a slip angle of a vehicle body of the vehicle having a same sign; and set, in response to the detection of the outwardly headed state, a target accelerator operation amount so that a difference between a driving force on the front wheel caused by an output of the travel power source and an absolute value of a braking force on the front wheel caused by internal circulation torque of the transfer is reduced. The information presentation device is configured to present the driver with information regarding the target accelerator operation amount.

An aspect of the disclosure provides a driving assistance apparatus to be mounted on a vehicle. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes circuitry and an information presentation device. The circuitry is configured to: make a detection of an inwardly headed state in which the vehicle is cornering with a yaw rate and a slip angle of a vehicle body of the vehicle having different signs; and set, in response to the detection of the inwardly headed state, a target accelerator operation amount so that a difference between a driving force on the rear wheel caused by an output of the travel power source and an absolute value of a braking force on the rear wheel caused by internal circulation torque of the transfer is reduced. The information presentation device is configured to present the driver with information regarding the target accelerator operation amount.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 6A and 6B are diagrams schematically illustrating states of braking or driving forces on front wheels and rear wheels in the outwardly headed state in one example embodiment.

FIGS. 7A and 7B are diagrams schematically illustrating states of the braking or driving forces on the front wheels and the rear wheels in the inwardly headed state in one example embodiment.

DETAILED DESCRIPTION

Figure 1:
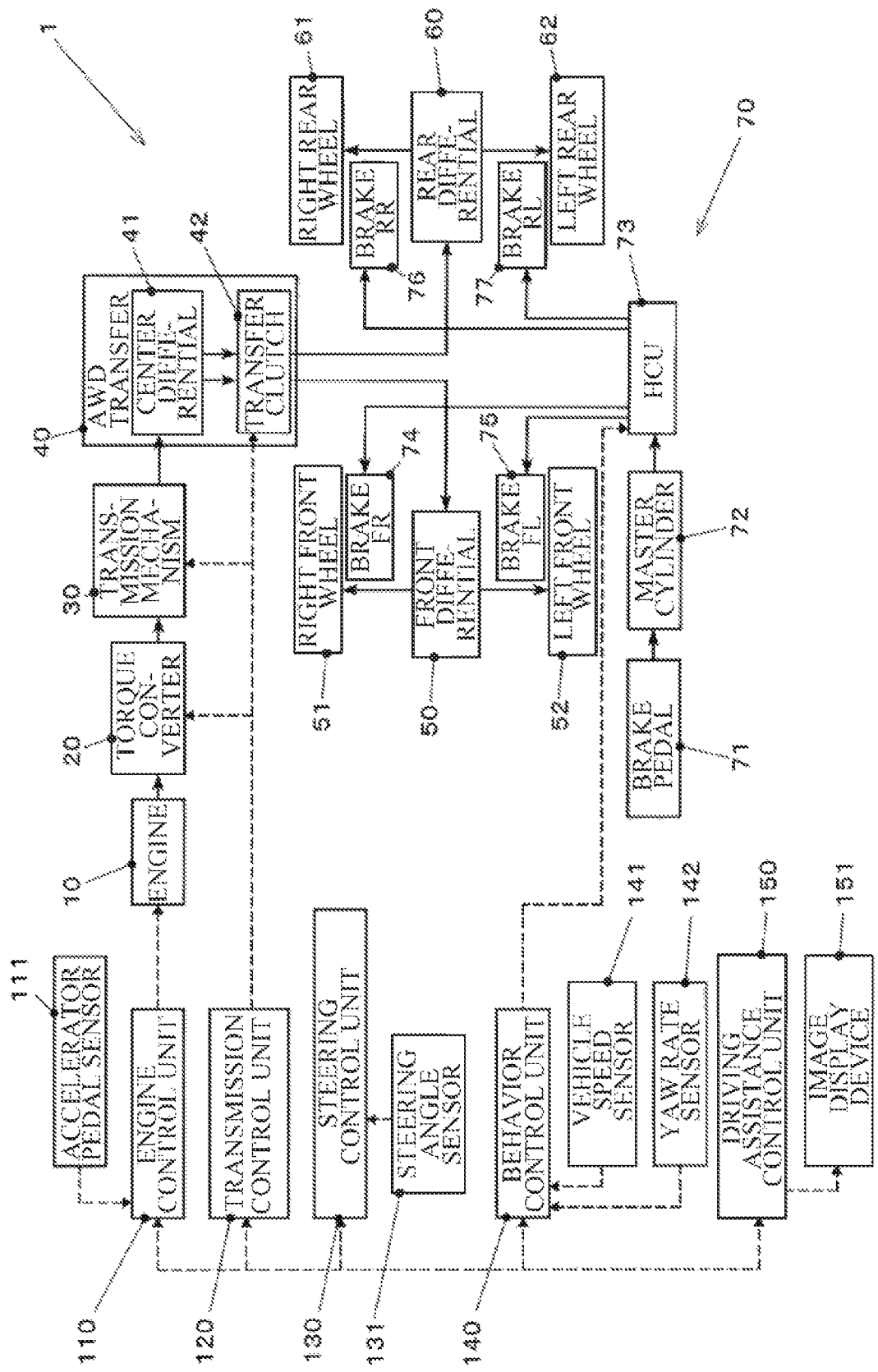
FIG. 1 is a diagram schematically illustrating a configuration of a vehicle including a driving assistance apparatus according to one example embodiment of the disclosure.

When a vehicle is cornering, in an outwardly headed state in which a front wheel moves outwardly of a rear wheel when cornering, a braking force is generated on the front wheel by internal circulation torque of an AWD transfer.

In an inwardly headed state in which the rear wheel moves outwardly of the front wheel when cornering, a braking force is generated on the rear wheel by the internal circulation torque of the AWD transfer.

Such braking forces resulting from the internal circulation torque reduces lateral forces to be generated by tires, resulting in further promotion of the inwardly headed state and the outwardly headed state.

To address this, it is possible for a driver with a high driving skill to achieve stable traveling by applying driving forces to tires by an accelerator operation to increase lateral forces to be generated by the tires, to cancel out the braking forces resulting from the internal circulation torque.

However, it can be difficult for a general driver to determine a suitable accelerator operation amount in this case.

It is desirable to provide a driving assistance apparatus that makes it possible to prompt a driver to perform an accelerator operation that increases a lateral force to be generated by a tire when a vehicle is cornering.

According to an aspect of the disclosure, a driving assistance apparatus to be mounted on a vehicle is provided. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes an outwardly headed state detection unit, a target accelerator operation amount setting unit, and an information presentation unit. The outwardly headed state detection unit is configured to make a detection of an outwardly headed state in which the vehicle is cornering with a yaw rate and a slip angle of a vehicle body of the vehicle having a same sign. The target accelerator operation amount setting unit is configured to set, in response to the detection of the outwardly headed state, a target accelerator operation amount that reduces a difference between a driving force on the front wheel caused by an output of the travel power source and an absolute value of a braking force on the front wheel caused by internal circulation torque of the transfer. The information presentation unit is configured to present the driver with information regarding the target accelerator operation amount.

In general, in a vehicle including an all-wheel-drive (AWD) transfer, when a difference in rotation speed is caused between a front wheel and a rear wheel, internal circulation torque is transmitted from the wheel at higher rotation speed to the wheel at lower rotation speed.

In the outwardly headed state, the yaw rate and the slip angle of the vehicle body have the same sign. In the outwardly headed state, the vehicle assumes a posture in which the front of the vehicle is directed outwardly of cornering with respect to the vehicle's direction of travel. The front of the vehicle means front side of the vehicle body in a direction of a longitudinal axis of the vehicle body. In this case, a cornering radius at the front wheel is greater than a cornering radius at the rear wheel. Accordingly, the rotation speed of the front wheel is greater than the rotation speed of the rear wheel.

In this case, because of the internal circulation torque, the braking force is generated on the front wheel while the driving force is generated on the rear wheel.

According to the aspect of the disclosure, in the outwardly headed state, the target accelerator operation amount is presented to the driver, to reduce the difference between the driving force on the front wheel caused by the output of the travel power source and the absolute value of the braking force on the front wheel caused by the internal circulation torque. This makes it possible to prompt the driver to perform an accelerator operation that reduces the absolute value of the braking or driving force to be transmitted by the front wheel to the road surface, leading to an increase in a lateral force to be generated by a tire of the front wheel. The accelerator operation thus makes it possible to enhance head turning performance of the vehicle.

In this case, the target accelerator operation amount setting unit may set the target accelerator operation amount, in response to the detection of the outwardly headed state, to equalize the driving force on the front wheel caused by the output of the travel power source and the absolute value of the braking force on the front wheel caused by the internal circulation torque of the transfer.

In the aspect of the disclosure, an inwardly headed state detection unit may be further provided. The inwardly headed state detection unit may make a detection of an inwardly headed state in which the vehicle is cornering with the yaw rate and the slip angle of the vehicle body of the vehicle having different signs. The target accelerator operation amount setting unit may be configured to set, in response to the detection of the inwardly headed state, the target accelerator operation amount that reduces a difference between a driving force on the rear wheel caused by the output of the travel power source and an absolute value of a braking force on the rear wheel caused by the internal circulation torque of the transfer.

According to an aspect of the disclosure, a driving assistance apparatus to be mounted on a vehicle is provided. The vehicle includes a transfer and a differential rotation limiting device. The transfer is configured to transmit a driving force generated by a travel power source in response to an accelerator operation to a front wheel driving device and a rear wheel driving device and to permit differential rotation between the front wheel driving device and the rear wheel driving device. The accelerator operation is performed by a driver who drives the vehicle. The front wheel driving device is configured to drive a front wheel. The rear wheel driving device is configured to drive a rear wheel. The differential rotation limiting device is configured to generate a limiting force that limits the differential rotation. The driving assistance apparatus includes an inwardly headed state detection unit, a target accelerator operation amount setting unit, and an information presentation unit. The inwardly headed state detection unit is configured to make a detection of an inwardly headed state in which the vehicle is cornering with a yaw rate and a slip angle of a vehicle body of the vehicle having different signs. The target accelerator operation amount setting unit is configured to set, in response to the detection of the inwardly headed state, a target accelerator operation amount that reduces a difference between a driving force on the rear wheel caused by an output of the travel power source and an absolute value of a braking force on the rear wheel caused by internal circulation torque of the transfer. The information presentation unit is configured to present the driver with information regarding the target accelerator operation amount.

In the inwardly headed state, the yaw rate and the slip angle of the vehicle body have the different signs. In the inwardly headed state, the vehicle assumes a posture in which the front of the vehicle is directed inwardly with respect to cornering with respect to the vehicle's direction of travel. In this case, the cornering radius at the rear wheel is greater than the cornering radius at the front wheel. Accordingly, the rotation speed of the rear wheel is greater than the rotation speed of the front wheel.

In this case, because of the internal circulation torque, the driving force is generated on the front wheel while the braking force is generated on the rear wheel.

According to the aspects of the disclosure, in the inwardly headed state, the target accelerator operation amount is presented to the driver, to reduce the difference between the absolute value of the braking force generated on the rear wheel by the internal circulation torque and the driving force on the rear wheel caused by the output of the travel power source. Hence it is possible to prompt the driver to perform an accelerator operation that reduces the absolute value of the braking or driving force to be transmitted by the rear wheel to the road surface, and increases a lateral force to be generated by a tire of the rear wheel. The accelerator operation thus leads to enhanced stability of the vehicle and prevention of spinning of the vehicle.

In this case, the target accelerator operation amount setting unit may set the target accelerator operation amount, in response to the detection of the inwardly headed state, to equalize the driving force on the rear wheel caused by the output of the travel power source and the absolute value of the braking force on the rear wheel caused by the internal circulation torque of the transfer.

In the aspects of the disclosure, the information presentation unit may be configured to present the driver with information regarding a discrepancy between the target accelerator operation amount and an actual accelerator operation amount.

This enables the driver to easily find whether the accelerator operation amount is to be increased or reduced, and also an amount of change in the accelerator operation amount, making it possible to promote the foregoing effects.

In the aspects of the disclosure, the information presentation unit may be configured to present the driver with the information regarding the target accelerator operation amount, when a steering angle of a steering device of the vehicle is increased or kept and an accelerator operation amount based on the accelerator operation performed by the driver is equal to or greater than a predetermined value.

This makes it possible to prevent a situation in which the information regarding the target accelerator operation amount is presented at the time of straight traveling, when a difference in locus between the front wheel and the rear wheel is absent or very small, or at the time of entry to or exit from a corner, when the driver focuses on deceleration or acceleration, and the presentation causes a mismatch between the driver's operation and sensation and gives a feeling of strangeness to the driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Description is given of a driving assistance apparatus according to an example embodiment of the disclosure.

The driving assistance apparatus according to the example embodiment may be provided in, for example, an automobile such as an all-wheel-drive (AWD), four-wheeled passenger car.

FIG. 1 schematically illustrates a configuration of a vehicle including the driving assistance apparatus according to the example embodiment.

As illustrated in FIG. 1, a vehicle 1 may include, without limitation, an engine 10, a torque converter 20, a transmission mechanism 30, an AWD transfer 40, a front differential 50, a rear differential 60, and a brake device 70.

The engine 10 may serve as a travel power source of the vehicle 1. The engine 10 may include, without limitation, an internal combustion engine such as a gasoline engine.

The torque converter 20 may include a fluid coupling that transmits an output of the engine 10 to the transmission mechanism 30. The torque converter 20 may serve as a starting device that allows a vehicle to start from a vehicle speed of zero.

The torque converter 20 may include a lock-up clutch that directly couples input side and output side.

The transmission mechanism 30 may include, without limitation, a continuously variable transmission (CVT) or a stepped automatic transmission (AT). The CVT may include a variator including, without limitation, a pair of variable pulleys and a chain or a belt. The stepped AT may include a plurality of rows of planetary gear sets. The transmission mechanism 30 may be configured to convert the output of the engine 10 for shifting. The output of the engine 10 may be inputted to the transmission mechanism 30 from the torque converter 20.

An output of the transmission mechanism 30 may be transmitted to the AWD transfer 40.

The AWD transfer 40 may include a driving force transmission device that distributes a driving force inputted from the transmission mechanism 30 to the front differential 50 and the rear differential 60, and transmits the resultant forces to the front differential 50 and the rear differential 60. In one embodiment, the AWD transfer 40 may serve as a "transfer".

The AWD transfer 40 may include, without limitation, a center differential 41 and a transfer clutch 42.

The center differential 41 may include, without limitation, a driving force distribution mechanism. The driving force distribution mechanism may include a composite planetary gear set, and may be configured to perform torque distribution to the front differential 50 and the rear differential 60 at a torque distribution ratio of, for example, about 35:65.

Moreover, the center differential 41 may also serve as a differential mechanism that absorbs differential rotation between the front differential 50 and the rear differential 60. The differential rotation between the front differential 50 and the rear differential 60 is caused by, for example, a difference in locus between the front and rear wheels when cornering.

The transfer clutch 42 may include, without limitation, a differential motion limiting mechanism, or a limited slip differential (LSD), that limits differential motion between output units on front wheel side and on rear wheel side of the center differential 41. In one embodiment, the transfer clutch 42 may serve as a "differential rotation limiting device".

The transfer clutch 42 may include, without limitation, a wet multi-plate clutch. The wet multi-plate clutch may be driven by hydraulic pressure or an electromagnetic force. An engagement force, or a clutch crimping force, of the wet multi-plate clutch may be controlled by a transmission control unit 120 described later. The engagement force is also referred to as differential motion limiting torque, or a differential rotation limiting force.

The AWD transfer 40 may be configured to change the engagement force of the transfer clutch 42, to make continuous adjustment of a driving force distribution ratio between the front wheel side and the rear wheel side, for example, from 35:65 to 50:50.

The front differential 50 may make final deceleration of a front wheel side driving force transmitted from the AWD transfer 40, while transmitting the front wheel side driving force to a right front wheel 51 and a left front wheel 52. Moreover, the front differential 50 may serve as a differential mechanism that absorbs differential rotation between the right front wheel 51 and the left front wheel 52.

In one embodiment, the front differential 50, together with an unillustrated drive shaft or the like, may serve as a "front wheel driving device".

The rear differential 60 may make final deceleration of a rear wheel side driving force transmitted from the AWD transfer 40 through an unillustrated propeller shaft, while transmitting the rear wheel side driving force to a right rear wheel 61 and a left rear wheel 62. Moreover, the rear differential 60 may also serve as a differential mechanism that absorbs differential rotation between the right rear wheel 61 and the left rear wheel 62.

In one embodiment, the rear differential 60, together with the propeller shaft and an unillustrated drive shaft or the like, may serve as a "rear wheel driving device".

The brake device 70 may include, without limitation, a brake pedal 71, a master cylinder 72, a hydraulic control unit (HCU) 73, a brake FR 74, a brake FL 75, a brake RR 76, and a brake RL 77.

The brake pedal 71 may include an input unit that allows a driver who drives the vehicle 1 to make a brake operation.

The master cylinder 72 may be coupled to the brake pedal 71. The master cylinder 72 may be configured to pressurize a brake fluid in response to depression of the brake pedal 71. The master cylinder 72 may include a vacuum doubling device that amplifies an input from the brake pedal 71 with the use of an intake pipe negative pressure of the engine 10.

The hydraulic control unit 73 may individually increase or decrease fluid pressure of the brake fluid to be supplied to a wheel cylinder of each wheel for purposes of, for example, an anti-lock brake control, a yaw control, and an automatic brake control.

The hydraulic control unit 73 may include, without limitation, an electric pump and a control valve. The electric pump may pressurize the brake fluid. The control valve may individually adjust the fluid pressure of each wheel cylinder.

The brake FR 74, the brake FL 75, the brake RR 76, and the brake RL 77 may be provided respectively on the right front wheel 51, the left front wheel 52, the right rear wheel 61, and the left rear wheel 62. Each brake may include, without limitation, a disk-shaped rotor and a caliper. The disk-shaped rotor may rotate with the wheel. The caliper may pressurize a pad into contact with the rotor. The caliper may include, without limitation, the wheel cylinder that presses the pad by the fluid pressure of the brake fluid supplied from the hydraulic control unit 73.

The vehicle 1 may further include, without limitation, an engine control unit 110, the transmission control unit 120, a steering control unit 130, a behavior control unit 140, and a driving assistance control unit 150. Each processor may include, without limitation, an information processor such as a central processing unit (CPU), a storage such as a random access memory (RAM) and/or a read only memory (ROM), an input/output interface, and a bus that couples them together.

The processors may be communicably coupled, for example, through an in-vehicle local area network (LAN) such as a controller area network (CAN) communication system, or directly.

The engine control unit 110 may make a comprehensive control of the engine 10 and its auxiliaries.

The engine control unit 110 may make an output adjustment of the engine 10.

The engine control unit 110 may provide setting of driver request torque based on an amount of the driver's accelerator operation detected by means of an accelerator pedal sensor 111. The engine control unit 110 may also control, for example, a throttle position, an amount of fuel injection, fuel injection timing, ignition timing, valve timing, an exhaust gas recirculation (EGR) rate, and an oversupply pressure of the engine 10, to allow actual torque of the engine 10 to match the driver request torque.

For example, the throttle position is dominant in output torque of the engine, and may thus be used as an index indicating an output state of the travel power source of the vehicle.

The accelerator pedal sensor 111 may be provided on, for example, an accelerator pedal that receives the accelerator operation performed by the driver depressing the accelerator pedal. The accelerator pedal sensor 111 may include a position encoder that detects an operation amount of the accelerator pedal.

In a gasoline engine that undergoes an output adjustment using a throttle valve, the operation amount of the accelerator pedal normally has a predetermined correlation with the throttle position, and is often practically convertible into the throttle position. The operation amount of the accelerator pedal is also referred to as an accelerator operation amount.

The transmission control unit 120 may make, for example, a shifting control and a forward and reverse switching control in the transmission mechanism 30, and an engagement force control, or a limiting force control, of the lock-up clutch in the torque converter 20.

Moreover, the transmission control unit 120 may change the engagement force of the transfer clutch 42 of the AWD transfer 40, to change the differential rotation limiting force, and to control the driving force distribution ratio between the front wheel side and the rear wheel side, and internal circulation torque.

The steering control unit 130 may control an electric power steering (EPS) unit. The EPS unit may be provided in an unillustrated steering device.

The steering control unit 130 may control, for example, an electric motor that generates assisting power, in accordance with steering torque inputted by the driver through a steering wheel.

The steering control unit 130 may be coupled to a steering angle sensor 131. The steering angle sensor 131 may detect a steering angle δ in the steering device.

The behavior control unit 140 may control the hydraulic control unit 73 and control individually the fluid pressure of the wheel cylinders of the brake FR 74, the brake FL 75, the brake RR 76, and the brake RL 77. The fluid pressure of the wheel cylinder correlates with a braking force.

The behavior control unit 140 may make, for example, the anti-lock brake control and a behavior control. The anti-lock brake control includes, in a case of a wheel lock caused by braking, periodically depressurizing the fluid pressure of the wheel cylinder of the relevant wheel, to restore the rotation of the wheel. The behavior control includes, in a case of oversteer behavior or understeer behavior, generating a difference in the braking force between the left and right wheels, to suppress a yaw moment in a direction in which such behavior is suppressed.

To make these controls, a vehicle speed sensor 141 and a yaw rate sensor 142 may be coupled to the behavior control unit 140. The vehicle speed sensor 141 may individually detect a rotation speed of each wheel. The yaw rate sensor 142 may detect a yaw rate of a vehicle body.

The driving assistance control unit 150 may acquire information regarding the steering angle detected by the steering angle sensor 131 from the steering control unit 130, to make a detection of an outwardly headed state and an inwardly headed state. The outwardly headed state means a state in which the front of the vehicle is directed outwardly of cornering with respect to the vehicle's direction of travel. The front of the vehicle means front side of the vehicle body in a direction of a longitudinal axis of the vehicle body. The inwardly headed state means a state in which the front of the vehicle is directed inwardly of cornering with respect to the vehicle's direction of travel.

In one embodiment, the driving assistance control unit 150 may serve as an "outwardly headed state detection unit" and an "inwardly headed state detection unit".

In an AWD vehicle as in the example embodiment, the internal circulation torque may be generated in accordance with a difference in rotation speed, i.e., differential rotation, between the front and rear wheels caused by cornering, for example. The internal circulation torque is torque exchanged between the front wheel side and the rear wheel side through the AWD transfer 40.

Figure 2:
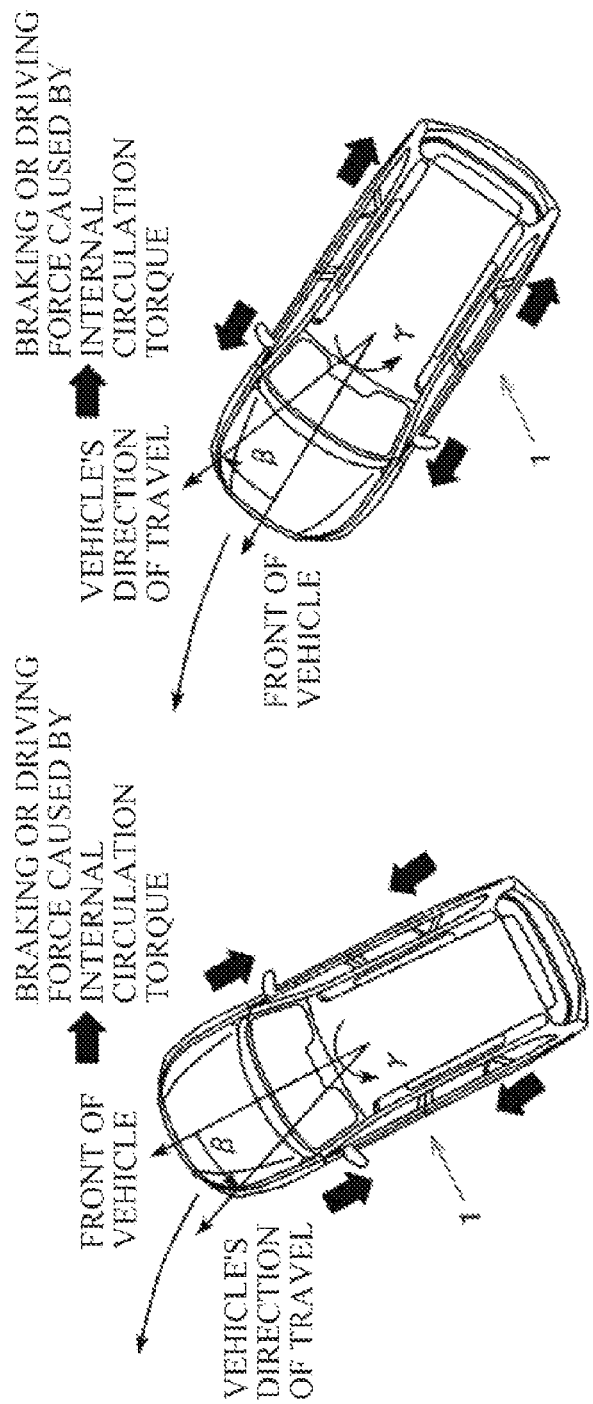
FIGS. 2A and 2B are diagrams schematically illustrating states of internal circulation torque in an outwardly headed state and an inwardly headed state.

FIGS. 2A and 2B are schematic diagrams illustrating states of the internal circulation torque in the outwardly headed state and the inwardly headed state.

FIG. 2A illustrates the outwardly headed state.

The outwardly headed state is a state in which a slip angle β and a yaw rate γ of the vehicle have the same sign.

The slip angle β and the yaw rate γ of the vehicle are expressed by Expressions 1 and 2 respectively.

$$\beta = \left( \frac{1 - \frac{m}{2l} \frac{l_f}{l_r K_r} V^2}{1 - \frac{m}{2l^2} \frac{l_f K_f - l_r K_r}{K_f K_r} V^2} \right) \frac{l_r}{l} \delta \qquad \text{(Expression 1)}$$

$$\gamma = \left( \frac{1}{1 - \frac{m}{2l^2} \frac{l_f K_f - l_r K_r}{K_f K_r} V^2} \right) \frac{V}{l} \delta \qquad \text{(Expression 2)}$$

β: slip angle
γ: yaw rate
V: vehicle speed
δ: steering angle
m: vehicle weight
l: wheelbase
$l_f$: longitudinal distance from center of gravity to front wheel axle $l_r$: longitudinal distance from center of gravity to rear wheel axle $K_f$: front wheel equivalent cornering power (CP)

$K_r$: rear wheel equivalent cornering power (CP)

The yaw rate, the vehicle speed, and the steering angle may be detected in real time respectively by the yaw rate sensor 142, the vehicle speed sensor 141, and the steering angle sensor 131.

The vehicle weight m and subsequent numerical values may be set in advance based on vehicle specifications.

In the outwardly headed state, comparison between the right front wheel 51 and the right rear wheel 61, and comparison between the left front wheel 52 and the left rear wheel 62 indicate that a cornering radius at the front wheel is greater than a cornering radius at the rear wheel. In other words, the front wheel moves outwardly of the rear wheel when cornering. Accordingly, the rotation speed of the front wheel is greater than the rotation speed of the rear wheel.

In this case, the internal circulation torque from the front differential 50 to the rear differential 60 is generated through the AWD transfer 40.

As a result, as denoted by arrows in FIG. 2A, because of the internal circulation torque, the braking forces are generated on the front wheels while the driving forces are generated on the rear wheels.

FIG. 2B illustrates the inwardly headed state.

The inwardly headed state is a state in which the slip angle β and the yaw rate γ of the vehicle have different signs.

In the inwardly headed state, comparison between the right front wheel 51 and the right rear wheel 61, and comparison between the left front wheel 52 and the left rear wheel 62 indicate that the cornering radius at the rear wheel is greater than the cornering radius at the front wheel. In other words, the rear wheel moves outwardly of the front wheel when cornering. Accordingly, the rotation speed of the rear wheel is greater than the rotation speed of the front wheel.

In this case, the internal circulation torque from the rear differential 60 to the front differential 50 is generated through the AWD transfer 40.

As a result, as denoted by arrows in FIG. 2B, because of the internal circulation torque, the driving forces are generated on the front wheels while the braking forces are generated on the rear wheels.

The driving assistance control unit 150 sets, based on information acquired from each unit, for example, a target accelerator operation amount that increases a lateral force on a front wheel tire or a rear wheel tire in accordance with the inwardly headed state or the outwardly headed state of the vehicle 1, and presents the driver with the target accelerator operation amount. In one embodiment, the driving assistance control unit 150 may serve as a "target accelerator operation amount setting unit".

The driving assistance control unit 150 may be coupled to an image display device 151.

The image display device 151 may display image information to the driver of the vehicle 1. In one embodiment, the image display device 151 may serve as an "information presentation unit".

The image display device 151 may include, for example, a liquid crystal display (LCD) or an organic electroluminescence (EL) display provided on an instrument panel, or a head-up display that projects an image on a windshield.

A specific display mode in the image display device 151 will be described in detail later.

In the example embodiment, in the outwardly headed state, the target accelerator operation amount may be presented to the driver to cancel out the braking forces generated on the front wheels by the internal circulation torque of the AWD transfer 40, with a driving force caused by the output torque of the engine 10. In the inwardly headed state, the target accelerator operation amount may be presented to the driver to cancel out the braking forces generated on the rear wheels by the internal circulation torque, with the output torque of the engine 10.

This leads to an increase in the lateral forces to be generated by tires of the front wheels in the outwardly headed state, and an increase in the lateral forces to be generated by tires of the rear wheels in the inwardly headed state.

A braking or driving force $F_i$ caused by the internal circulation torque is expressed by Expression 3.

$$F_i = p \cdot K_x(\mu) \cdot \frac{rl}{V}\beta \quad \text{(Expression 3)}$$

$F_i$: braking or driving force caused by internal circulation torque p: differential rotation limitation rate in transfer clutch (0: free state, 1: locked state)

$K_x(\mu)$: driving stiffness

When a braking or driving force caused by engagement torque of the transfer clutch 42 is denoted by $F_p$, if $F_i < F_p$ holds, the braking or driving force caused by the actual internal circulation torque is $F_i$.

When $F_i \geq F_p$ holds, i.e., when the transfer clutch 42 has slipped, the braking or driving force caused by the actual internal circulation torque is $F_p$.

A total driving force $F_{f\_total}$ on the front wheel and a total driving force $F_{r\_total}$ on the rear wheel are expressed by Expressions 4 and 5 respectively.

$$F_{f\_total} = \alpha F_d - F_i \quad \text{(Expression 4)}$$
$$= \alpha F_d - p \cdot K_x(\mu) \cdot \frac{rl}{V}\beta$$
$$F_{r\_total} = \alpha F_d + F_i \quad \text{(Expression 5)}$$

$F_{f\_total}$: total driving force on front wheel $F_{r\_total}$: total driving force on rear wheel $F_d$: driving force applied by driver α: front-rear driving force distribution by AWD transfer In the example embodiment, driving assistance may be performed to present, in accordance with the vehicle speed and a steering operation, an appropriate accelerator operation amount set in consideration of the internal circulation torque to the driver, to allow even a general driver to perform driving close to that of a driver with a high driving skill.

In one example, when the vehicle is in the outwardly headed state, to cancel out the braking force applied to the front wheel by the internal circulation torque with a driving force, a target driving force $F_{tgt}$ to be applied by the driver may be set as in Expressions 6 and 7 for when $F_i < F_p$ holds and Expressions 8 and 9 for when $F_i \geq F_p$ holds.

$$F_{tgt} \times \alpha = F_i \quad \text{(Expression 6)}$$
$$F_{tgt} = F_i/\alpha \quad \text{(Expression 7)}$$
$$F_{tgt} \times \alpha = F_p \quad \text{(Expression 8)}$$
$$F_{tgt} = F_p/\alpha \quad \text{(Expression 9)}$$

$F_{tgt}$: target driving force to be applied by driver
α: driving force distribution (distribution to front wheel) by AWD transfer
$F_p$: transfer clutch engagement torque When the vehicle is in the inwardly headed state, to cancel out the braking force applied to the rear wheel by the internal circulation torque with a driving force, the target driving force $F_{tgt}$ to be applied by the driver may be set as in Expressions 10 and 11 for when $F_i<F_p$ holds and Expressions 12 and 13 for when $F_i \geq F_p$ holds.

$$F_{tgt} \times (1-\alpha) = F_i \quad \text{(Expression 10)}$$

$$F_{tgt} = F_i/(1-\alpha) \quad \text{(Expression 11)}$$

$$F_{tgt} \times (1-\alpha) = F_p \quad \text{(Expression 12)}$$

$$F_{tgt} = F_p/(1-\alpha) \quad \text{(Expression 13)}$$

Figure 3:
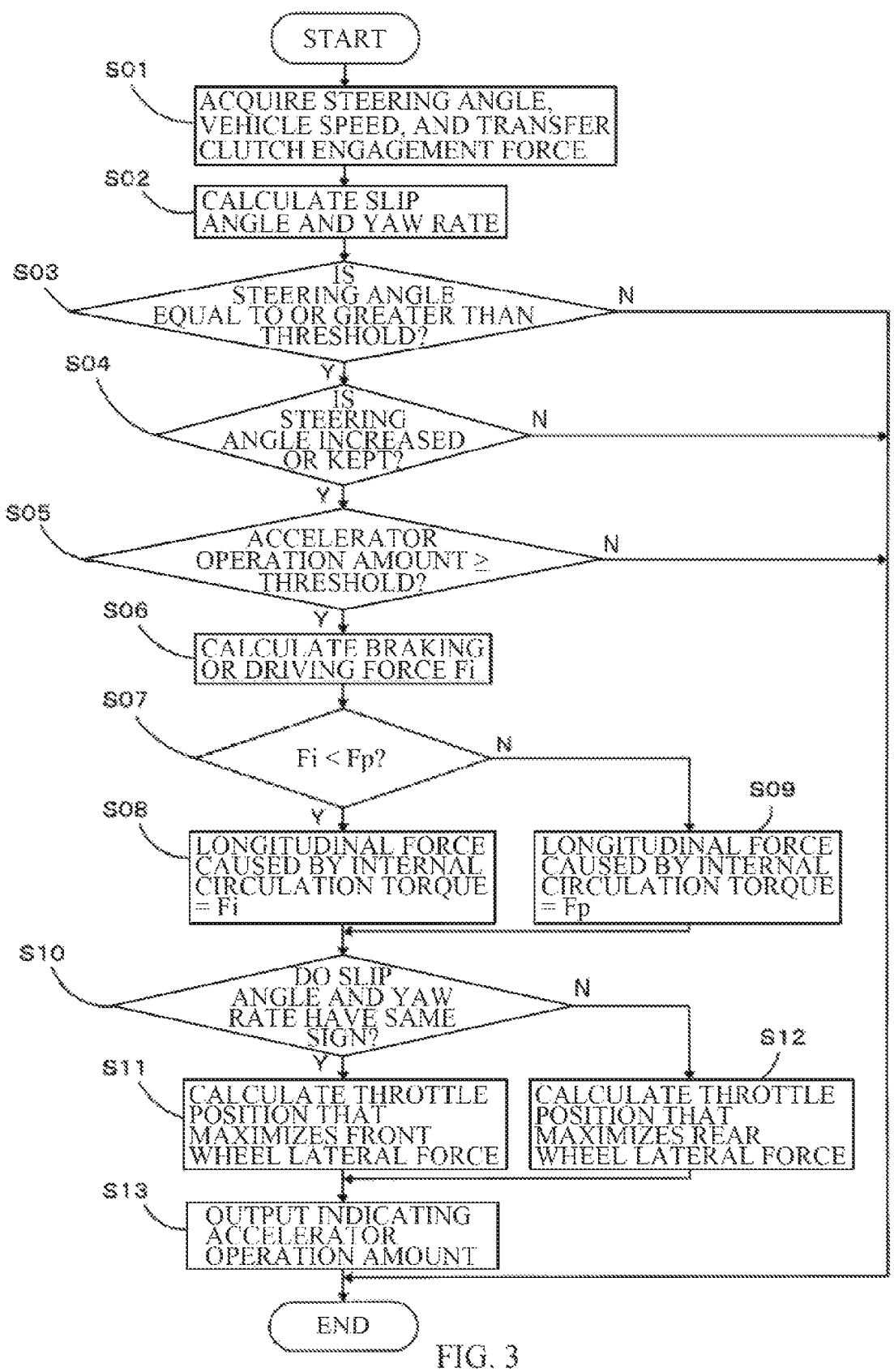
FIG. 3 is a flowchart illustrating operation of the driving assistance apparatus according to one example embodiment.

FIG. 3 is a flowchart illustrating operation of the driving assistance apparatus according to the example embodiment.

In the following, description is given in the order of steps.

[Step S01: Acquisition of Steering Angle, Vehicle Speed, and Transfer Clutch Engagement Force]

The driving assistance control unit 150 may acquire information regarding the steering angle δ, the vehicle speed V, and the engagement torque $F_p$ of the transfer clutch 42 respectively from the steering angle sensor 131, the vehicle speed sensor 141, and the transmission control unit 120.

Thereafter, the flow may proceed to step S02.

[Step S02: Calculation of Slip Angle and Yaw Rate]

The driving assistance control unit 150 may calculate the slip angle β and the yaw rate γ using Expressions 1 and 2 given above.

Thereafter, the flow may proceed to step S03.

[Step S03: Determination of Steering Angle]

The driving assistance control unit 150 may compare the steering angle δ detected by the steering angle sensor 131 with a predetermined threshold.

If the steering angle δ is equal to or greater than the threshold (step S03: Y), the flow may proceed to step S04 on the assumption that the vehicle is in a cornering state, and otherwise (step S03: N), the series of processes may be ended, or a return may be made, on the assumption that the vehicle is in a straight traveling state.

[Step S04: Determination of Whether Steering Angle is Increased or Kept]

The driving assistance control unit 150 may determine whether the steering angle δ detected by the steering angle sensor 131 is increased, i.e., the steering wheel is further turned, or kept equal to or greater than a predetermined value.

If the vehicle is in a state in which the steering angle δ is increased or kept equal to or greater than the predetermined value (step S04: Y), the flow may proceed to step S05. Otherwise, i.e., if the vehicle is in a state in which the steering angle is reduced, i.e., the steering wheel is turned back (step S04: N), the series of processes may be ended.

[Step S05: Determination of Accelerator Operation Amount]

The driving assistance control unit 150 may determine whether the operation amount of the accelerator pedal, i.e., the accelerator operation amount, detected by the accelerator pedal sensor 111 is equal to or greater than a predetermined threshold.

The threshold may be set, for example, in consideration of an intermediate or partial position of a throttle that can result from the accelerator operation performed by the driver when the vehicle travels on a normal curved road.

If the accelerator operation amount is equal to or greater than the threshold (step S05: Y), the flow may proceed to step S06 on the assumption that the vehicle is in a partial throttle state. Otherwise (step S05: N), the series of processes may be ended on the assumption that the vehicle is in an accelerator-off state.

[Step S06: Calculation of Braking or Driving Force $F_i$ Based on Differential Rotation]

The driving assistance control unit 150 may calculate, using Expression 3 given above, the braking or driving force $F_i$ caused by a longitudinal force, i.e., the internal circulation torque, based on differential rotation between the front and rear wheels.

Thereafter, the flow may proceed to step S07.

[Step S07: Comparison Between Braking or Driving Force Caused by Internal Circulation Torque and Braking or Driving Force Caused by Transfer Clutch Engagement Torque]

The driving assistance control unit 150 may compare the braking or driving force $F_i$ caused by the internal circulation torque calculated in step S06, with the braking or driving force $F_p$ caused by the engagement torque of the transfer clutch 42.

If $F_i$ is less than $F_p$ (step S07: Y), the flow may proceed to step S08, and otherwise (step S07: N), the flow may proceed to step S09.

[Step S08: Longitudinal Force Caused by Internal Circulation Torque=$F_i$]

The driving assistance control unit 150 may set $F_i$ as the braking or driving force caused by the internal circulation torque to be used for calculation of a target throttle position.

Thereafter, the flow may proceed to step S10.

[Step S09: Longitudinal Force Caused by Internal Circulation Torque=$F_p$]

The driving assistance control unit 150 may set $F_p$ as the braking or driving force caused by the internal circulation torque to be used for calculation of the target throttle position.

Thereafter, the flow may proceed to step S10.

[Step S10: Determination of Signs of Slip Angle and Yaw Rate]

The driving assistance control unit 150 may determine whether the slip angle β and the yaw rate γ calculated in step S02 have the same sign.

If the slip angle β and the yaw rate γ have the same sign (step S10: Y), the flow may proceed to step S11 on the assumption that the vehicle is in the outwardly headed state. If the slip angle β and the yaw rate γ have different signs (step S10: N), the flow may proceed to step S12 on the assumption that the vehicle is in the inwardly headed state.

[Step S11: Calculation of Throttle Position that Maximizes Front Wheel Lateral Force]

The driving assistance control unit 150 may set, based on Expressions 6 to 9 given above, the target driving force $F_{tgt}$ that maximizes the lateral force on the front wheel, or brings the longitudinal force on the front wheel to zero.

The driving assistance control unit 150 may calculate the target throttle position of the engine 10, i.e., the target accelerator operation amount, that allows the target driving force $F_{tgt}$ to be obtained.

Thereafter, the flow may proceed to step S13.

[Step S12: Calculation of Throttle Position that Maximizes Rear Wheel Lateral Force]

The driving assistance control unit 150 may set, based on Expressions 10 to 13 given above, the target driving force $F_{tgt}$ that maximizes the lateral force on the rear wheel, or brings the longitudinal force on the rear wheel to zero.

The driving assistance control unit 150 may calculate the target throttle position of the engine 10, i.e., the target accelerator operation amount, that allows the target driving force $F_{tgt}$ to be obtained.

Thereafter, the flow may proceed to step S13.

[Step S13: Output Indicating Accelerator Operation Amount]

The driving assistance control unit 150 may cause the image display device 151 to output and present information regarding the target throttle position, i.e., the target accelerator operation amount, to the driver.

A specific example of image display in the image display device 151 will be described in detail later.

Thereafter, the series of processes may be ended.

Figure 4:
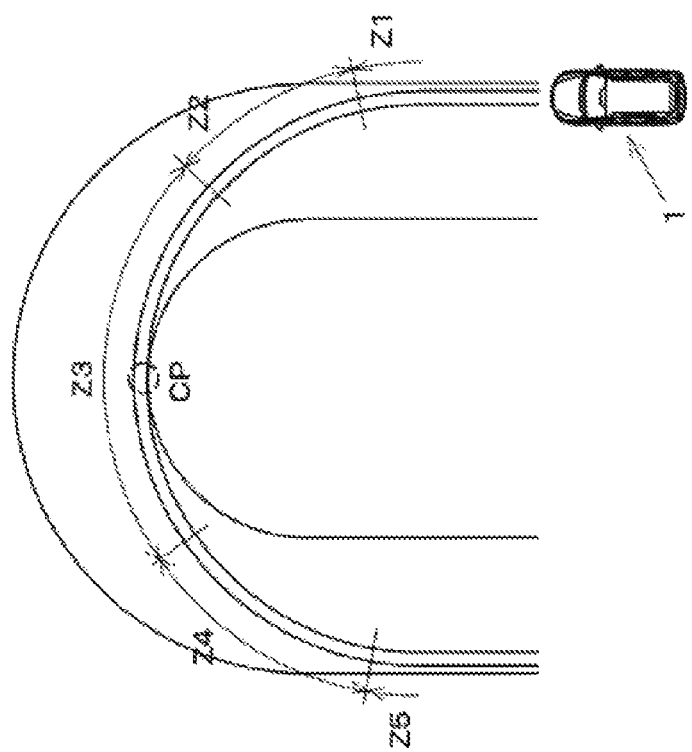
FIG. 4 is a diagram illustrating an example of state transition when the vehicle moves on a curved road.

FIG. 4 illustrates an example of state transition when the vehicle moves on a curved road at a corner.

FIG. 4 illustrates, as an example, a case where the vehicle 1 passes through a U-shaped left corner.

First, in a region (Z1) where the vehicle enters the curved road while braking in the straight traveling state, there is no difference in locus between the front and rear wheels, and the internal circulation torque calculated by the calculation method in the example embodiment is zero. At this time, the target throttle position is also zero.

In this state, information regarding the target throttle position is not presented to the driver. In other words, the steering angle is less than the threshold in step S03, and the process is ended.

In a region (Z2) for turn-in where the driver releases the brake pedal at an entrance of the corner and applies and increases the steering angle in the accelerator-off state, the internal circulation torque is calculated in accordance with a degree of the inwardly headed state or the outwardly headed state.

However, when information regarding the target throttle position is presented to the driver in such a state, the driver aiming for a clipping point CP while performing gradual deceleration is prompted to perform an accelerator-on operation, which can cause a mismatch between the driver's operation and sensation.

In this state, information regarding the target throttle position is not presented to the driver.

In other words, the accelerator operation amount is less than the threshold in step S05, and the process is ended.

In a region (Z3) where the driver keeps the throttle position at the intermediate or partial position and keeps the cornering state in the middle of the corner, the internal circulation torque is calculated in accordance with the degree of the inwardly headed state or the outwardly headed state.

In such a region, presentation of information regarding the target throttle position to the driver according to the example embodiment is effective, and allows the driver's operation and sensation to match.

Hence, the driving assistance according to the example embodiment, i.e., display of an image indicating information regarding the target throttle position, or the target accelerator operation amount, may be mainly performed in such a region.

In a region (Z4) where the vehicle starts rising acceleration at the end or an exit of the corner, the internal circulation torque is calculated in accordance with the degree of the inwardly headed state or the outwardly headed state.

However, because the driver intends to accelerate the vehicle by increasing the throttle position in such a region, when information regarding the target throttle position is presented to the driver, the accelerator-on operation can be restricted, which can cause a mismatch between the driver's operation and sensation.

In this state, information regarding the target throttle position is not presented to the driver. In other words, it is determined that the steering angle is reduced in step S04, and the process is ended.

In a region (Z5) where the vehicle exits the corner in the straight traveling state, there is no difference in locus between the front and rear wheels, and the internal circulation torque calculated by the calculation method in the example embodiment is zero. At this time, the target throttle position is also zero.

However, because the vehicle is to accelerate in the straight traveling state in this state, it is not appropriate to present information regarding the target throttle position.

In this state, information regarding the target throttle position is not presented to the driver. In other words, the steering angle is less than the threshold in step S03, and the process is ended.

Note that, in the regions Z4 and Z5, presentation such as image display may be performed to prompt the driver to perform acceleration, i.e., the accelerator-on operation, instead of presentation of information regarding the target throttle position.

Figure 5:
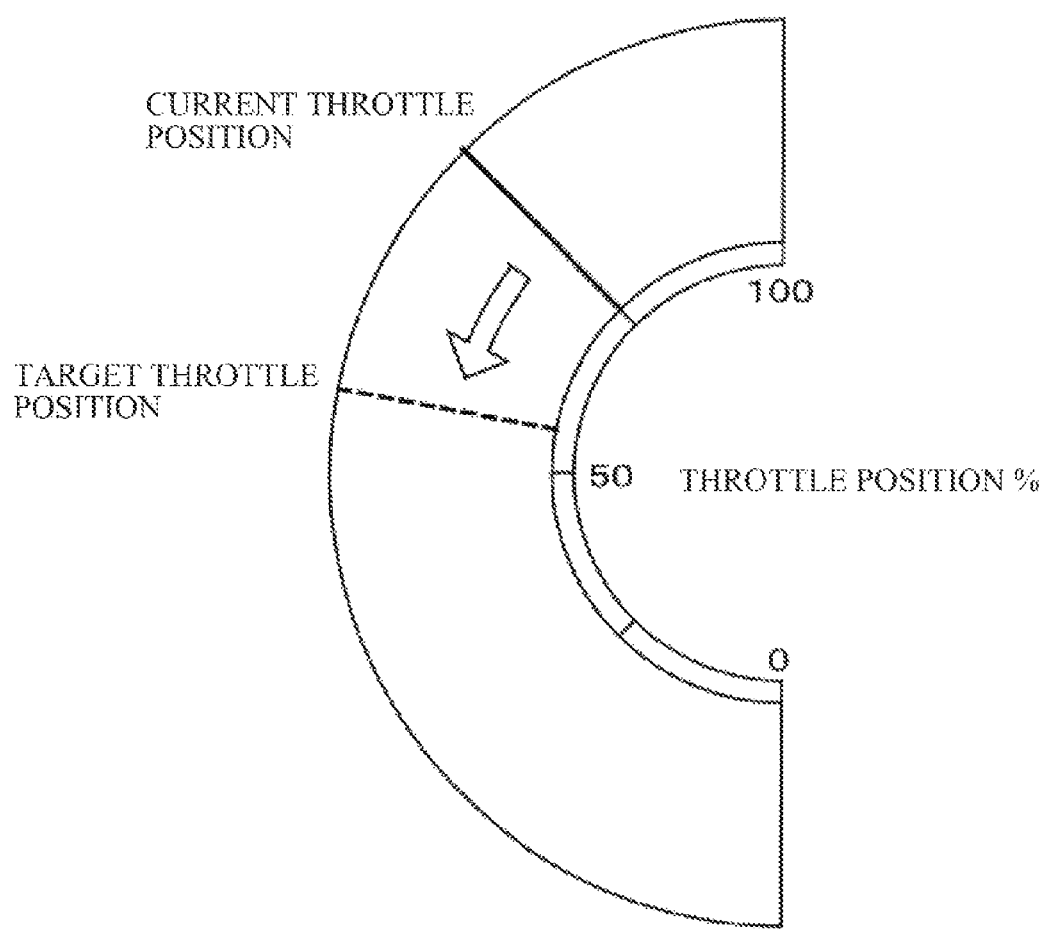
FIG. 5 is a diagram illustrating an example of an image displayed to indicate information regarding a target throttle position in one example embodiment.

FIG. 5 illustrates an example of an image displayed to indicate information regarding the target throttle position in the example embodiment.

As illustrated in FIG. 5, in the image, a current actual throttle position and the target throttle position calculated by the driving assistance control unit 150 may be displayed, for example, in the form of a graph. In one embodiment, the target throttle position may serve as "information regarding the target accelerator operation amount".

In the vehicle including, as the travel power source, the engine 10 that undergoes an output adjustment based on the throttle position, the throttle position may be converted into or read as the accelerator operation amount.

The actual throttle position increase or decreases in accordance with an increase or decrease in the accelerator operation amount, i.e., an amount of depression of the accelerator pedal, detected by the accelerator pedal sensor 111.

The example illustrated in FIG. 5 is a case where the actual throttle position is greater than the target throttle position.

The image displayed may include information regarding a discrepancy between the target throttle position and the actual throttle position. This information may be read as information regarding a discrepancy between the target accelerator operation amount and the accelerator operation amount.

In this case, the driver may perform an accelerator operation to ease up on the accelerator pedal to reduce the accelerator operation amount, to thereby bring the actual throttle position close to the target throttle position, i.e., allow an actual accelerator operation amount to match the target accelerator operation amount.

In the following, description is given of effects of the driving assistance control described above.

First, an accelerator-on state in the outwardly headed state is described. The accelerator-on state is a state in which the engine 10 is generating motive torque.

This case typically assumes, for example, low-speed cornering with a small cornering radius, on a road surface with a relatively high coefficient of friction ($\mu$).

Even on a road surface with a relatively low coefficient of friction, the vehicle can be in the outwardly headed state, for example, in low-speed cornering with a small cornering radius.

In this case, it is desired to enhance head turning performance of the vehicle.

FIGS. 6A and 6B are schematic diagrams illustrating states of the braking or driving forces on the front wheels and the rear wheels in the outwardly headed state in the example embodiment.

FIG. 6A separately illustrates the driving forces caused by a throttle operation and the braking or driving forces caused by the internal circulation torque. FIG. 6B illustrates total braking or driving forces as their composite. The same applies to FIGS. 7A and 7B. As described above, in the outwardly headed state, by the internal circulation torque, the braking forces are generated on the front wheels while the driving forces are generated on the rear wheels.

In the meanwhile, the driving force requested by the driver's accelerator operation is transmitted as the driving force to the front and rear wheels at the distribution ratio set by the transmission control unit 120 through the AWD transfer 40.

In the example embodiment, the target throttle position may be set, and the driver may be prompted to perform an accelerator operation corresponding to the target throttle position, to balance the driving forces requested by the driver on the right front wheel 51 and the left front wheel 52, and the braking forces caused by the internal circulation torque on the right front wheel 51 and the left front wheel 52, and to bring the braking or driving forces on the right front wheel 51 and the left front wheel 52 to zero. The braking or driving forces on the right front wheel 51 and the left front wheel 52 are longitudinal forces to be generated by the tires. Hence, it is possible to use frictional forces to be generated by the tires of the right front wheel 51 and the left front wheel 52, as the lateral forces.

This allows the right front wheel 51 and the left front wheel 52 to be able to generate high cornering forces, leading to enhancement in the head turning performance of the vehicle.

Next, the accelerator-on state in the inwardly headed state is described. The accelerator-on state is the state in which the engine 10 is generating the motive torque.

This case typically assumes, for example, high-speed cornering with a large cornering radius, on a road surface with a relatively low coefficient of friction.

Even on a road surface with a relatively high coefficient of friction, the vehicle can be in the inwardly headed state, for example, in high-speed cornering with a large cornering radius.

In this case, it is desired to lower possibility of spinning of the vehicle.

FIGS. 7A and 7B are schematic diagrams illustrating the states of the braking or driving forces on the front wheels and the rear wheels in the inwardly headed state in the example embodiment.

As described above, in the inwardly headed state, by the internal circulation torque, the driving forces are generated on the front wheels while the braking forces are generated on the rear wheels.

In the meanwhile, the driving force requested by the driver's accelerator operation is transmitted as the driving force to the front and rear wheels at the distribution ratio set by the transmission control unit 120 through the AWD transfer 40.

In the example embodiment, the target throttle position may be set, and the driver may be prompted to perform an accelerator operation corresponding to the target throttle position, to balance the driving forces requested by the driver on the right rear wheel 61 and the left rear wheel 62, and the braking forces caused by the internal circulation torque on the right rear wheel 61 and the left rear wheel 62, and to bring the braking or driving forces on the right rear wheel 61 and the left rear wheel 62 to zero. The braking or driving forces on the right rear wheel 61 and the left rear wheel 62 are longitudinal forces to be generated by the tires. Hence, it is possible to use frictional forces to be generated by the tires of the right rear wheel 61 and the left rear wheel 62, as the lateral forces.

This allows the right rear wheel 61 and the left rear wheel 62 to be able to generate high cornering forces, leading to enhanced stability of the vehicle and prevention of spinning of the vehicle.

According to the example embodiments described above, it is possible to achieve the following effects.

(1) In the outwardly headed state, the target throttle position, i.e., the target accelerator operation amount, is presented to the driver, to reduce the difference between the driving force on the front wheel caused by the output of the engine 10 and the absolute value of the braking force on the front wheel caused by the internal circulation torque of the AWD transfer 40. This makes it possible to prompt the driver to perform an accelerator operation that reduces the absolute value of the braking or driving force to be transmitted by the front wheel to the road surface, leading to an increase in the lateral force to be generated by the tire of the front wheel. The accelerator operation thus makes it possible to enhance the head turning performance of the vehicle 1.

(2) In the inwardly headed state, the target throttle position, i.e., the target accelerator operation amount, is presented to the driver, to reduce the difference between the absolute value of the braking force generated on the rear wheel by the internal circulation torque of the AWD transfer 40 and the driving force on the rear wheel caused by the output of the engine 10. Hence it is possible to prompt the driver to perform an accelerator operation that reduces the absolute value of the braking or driving force to be transmitted by the rear wheel to the road surface, and increases the lateral force to be generated by the tire of the rear wheel. The accelerator operation thus leads to enhanced stability of the vehicle 1 and prevention of spinning of the vehicle 1.

(3) An image displayed to be presented to the driver may include information regarding the discrepancy between the actual throttle position, i.e., the actual accelerator operation amount, and the target throttle position, i.e., the target accelerator operation amount. This enables the driver to easily find whether the accelerator operation amount is to be increased or reduced, and also an amount of change in the accelerator operation amount, making it possible to promote the foregoing effects.

(4) An image indicating information regarding the target throttle position, i.e., the target accelerator operation amount, may be displayed when the steering angle S of the steering device is increased or kept and the accelerator operation amount based on the accelerator operation performed by the driver is equal to or greater than the predetermined value, i.e., the vehicle is in the partial throttle state. This makes it possible to prevent a situation in which the information regarding the target throttle position is presented at the time of straight traveling, when a difference in locus between the front wheel and the rear wheel is absent or very small, or at the time of entry to or exit from a corner, when the driver focuses on deceleration or acceleration, and the presentation causes a mismatch between the driver's operation and sensation and gives a feeling of strangeness to the driver.

MODIFICATION EXAMPLES

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the vehicle and the driving assistance apparatus are not limited to the foregoing example embodiments, and may be changed as appropriate.

For example, in the example embodiments, the engine may serve as a travel power source, but this is non-limiting. The disclosure is also applicable to an engine-electric hybrid vehicle and a vehicle including an electric motor as a travel power source.

In this case, instead of the throttle position in the example embodiments, output torque of the motor may be used as an index indicating a driving force generated by the travel power source in accordance with the accelerator operation amount.

(2) In the example embodiments, for example, the planetary gear center differential is used, but this is non-limiting. For example, the center differential of other kinds, e.g., a bevel gear center differential, may be used.

In another example, an AWD system may be used in which one of the front wheel driving device and the rear wheel driving device is directly coupled to an output shaft of the transmission mechanism, and a driving force is transmitted to the other through the transfer clutch.

(3) The method of obtaining the slip angle and the yaw rate of the vehicle and the mathematical expressions to obtain the target driving force are not limited to those of the example embodiments, and may be changed as appropriate.

(4) In the example embodiments, the intervention by the driving assistance control is made in accordance with the outwardly headed state and the inwardly headed state. However, a simple configuration may be also employed in which the intervention by the control is made in either of these states.

(5) In the example embodiments, the method of presenting information regarding the target accelerator operation amount to the driver is an example, and may be changed as appropriate without being limited thereto.

For example, specific modes of image display may be changed as appropriate, without being limited to the mode in the example embodiments.

Information related to the target accelerator operation amount may be presented to the driver by another method, together with image display or instead of image display.

For example, information may be presented to the driver by means of an auditory sense such as sound, or a tactile sense such as vibration of a member that comes into contact with the driver, such as the accelerator pedal or a seat.

When the accelerator pedal includes a reaction force generator, an operating force on the accelerator pedal may change (e.g., increase) at the target accelerator operation amount.

Instead of presentation such as image display, for example, information regarding the target accelerator operation amount may be presented by a lighting mode (e.g., a color) of an indicator lamp.

(6) In the example embodiments, the vehicle includes the automatic transmission, for example, but this is non-limiting. The disclosure may also be applied to a vehicle including a manual transmission.

As described above, according to at least one embodiment of the disclosure, it is possible to provide a driving assistance apparatus that makes it possible to prompt a driver to perform an accelerator operation that increases a lateral force to be generated by a tire when a vehicle is cornering.

Each of the engine control unit 110, the transmission control unit 120, the steering control unit 130, the behavior control unit 140, and the driving assistance control unit 150 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of each of the engine control unit 110, the transmission control unit 120, the steering control unit 130, the behavior control unit 140, and the driving assistance control unit 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine control unit 110, the transmission control unit 120, the steering control unit 130, the behavior control unit 140, and the driving assistance control unit 150 illustrated in FIG. 1.

The invention claimed is:

1. A driving assistance apparatus to be mounted on a vehicle, the vehicle comprising a transfer and a differential rotation limiting device, the transfer being configured to transmit a driving force generated by a travel power source in response to an accelerator operation to a front wheel driving device and a rear wheel driving device and to permit differential rotation between the front wheel driving device and the rear wheel driving device, the accelerator operation being performed by a driver who drives the vehicle, the front wheel driving device being configured to drive a front wheel, the rear wheel driving device being configured to drive a rear wheel, the differential rotation limiting device being configured to generate a limiting force that limits the differential rotation, the driving assistance apparatus comprising:

a state detection unit coupled to at least a yaw rate sensor configured to detect a yaw rate of the vehicle, a vehicle speed sensor configured to detect a vehicle speed, and a steering angle sensor configured to detect a steering angle, wherein the state detection unit is configured to:
- calculate a slip angle using at least the detected steering angle and the detected vehicle speed;
- determine that the detected yaw rate and the calculated slip angle both have positive values or both have negative values; and
- detect an outwardly headed state during a turning state in response to determining that the detected yaw rate and the calculated slip angle both have positive values or both have negative values;

a target accelerator operation amount setting unit configured to set, in response to detecting the outwardly headed state, a target accelerator operation amount so that a difference between a driving force on the front wheel caused by an output of the travel power source and an absolute value of a braking force on the front wheel caused by internal circulation torque of the transfer is reduced; and an information presentation unit configured to present the driver with information regarding the target accelerator operation amount.

2. The driving assistance apparatus according to claim 1, wherein the state detection unit is further configured to detect an inwardly headed state during the turning state in response to determining that the detected yaw rate and the calculated slip angle both do not have positive values or both have negative values, and
wherein the target accelerator operation amount setting unit is configured to set, in response to detecting the inwardly headed state, the target accelerator operation amount so that a difference between a driving force on the rear wheel caused by the output of the travel power source and an absolute value of a braking force on the rear wheel caused by the internal circulation torque of the transfer is reduced.

3. The driving assistance apparatus according to claim 1, wherein the information presentation unit is configured to present the driver with information regarding a discrepancy between the target accelerator operation amount and an actual accelerator operation amount.

4. The driving assistance apparatus according to claim 1, wherein the information presentation unit is configured to present the driver with the information regarding the target accelerator operation amount, when a steering angle of a steering device of the vehicle is increased or kept and an accelerator operation amount based on the accelerator operation performed by the driver is equal to or greater than a predetermined value.

5. A driving assistance apparatus to be mounted on a vehicle, the vehicle comprising a transfer and a differential rotation limiting device, the transfer being configured to transmit a driving force generated by a travel power source in response to an accelerator operation to a front wheel driving device and a rear wheel driving device and to permit differential rotation between the front wheel driving device and the rear wheel driving device, the accelerator operation being performed by a driver who drives the vehicle, the front wheel driving device being configured to drive a front wheel, the rear wheel driving device being configured to drive a rear wheel, the differential rotation limiting device being configured to generate a limiting force that limits the differential rotation, the driving assistance apparatus comprising:
- an inwardly headed state detection unit coupled to at least a yaw rate sensor configured to detect a yaw rate of the vehicle, a vehicle speed sensor configured to detect a vehicle speed, and a steering angle sensor configured to detect a steering angle, wherein the inwardly headed state detection unit is configured to:
  - calculate a slip angle using at least the detected steering angle and the detected vehicle speed;
  - determine that the detected yaw rate has a positive value while the calculated slip angle has a negative value, or vice versa; and
  - detect an inwardly headed state during a turning state in response to determining that the detected yaw rate has a positive value while the calculated slip angle has a negative value, or vice versa;

a target accelerator operation amount setting unit configured to set, in response to the detection of the inwardly headed state, a target accelerator operation amount so that a difference between a driving force on the rear wheel caused by an output of the travel power source and an absolute value of a braking force on the rear wheel caused by internal circulation torque of the transfer is reduced; and an information presentation unit configured to present the driver with information regarding the target accelerator operation amount.

6. The driving assistance apparatus according to claim 5, wherein the information presentation unit is configured to present the driver with information regarding a discrepancy between the target accelerator operation amount and an actual accelerator operation amount.

7. The driving assistance apparatus according to claim 5, wherein the information presentation unit is configured to present the driver with the information regarding the target accelerator operation amount, when a steering angle of a steering device of the vehicle is increased or kept and an accelerator operation amount based on the accelerator operation performed by the driver is equal to or greater than a predetermined value.

8. A driving assistance apparatus to be mounted on a vehicle, the vehicle comprising a transfer and a differential rotation limiting device, the transfer being configured to transmit a driving force generated by a travel power source in response to an accelerator operation to a front wheel driving device and a rear wheel driving device and to permit differential rotation between the front wheel driving device and the rear wheel driving device, the accelerator operation being performed by a driver who drives the vehicle, the front wheel driving device being configured to drive a front wheel, the rear wheel driving device being configured to drive a rear wheel, the differential rotation limiting device being configured to generate a limiting force that limits the differential rotation, the driving assistance apparatus comprising:
- circuitry coupled to at least a yaw rate sensor configured to detect a yaw rate of the vehicle, a vehicle speed sensor configured to detect a vehicle speed, and a steering angle sensor configured to detect a steering angle, wherein the circuitry is configured to;
  - calculate a slip angle using at least the detected steering angle and the detected vehicle speed;
  - determine that the detected yaw rate and the calculated slip angle both have positive values or both have negative values;
  - detect an outwardly headed state during a turning state in response to determining that the detected yaw rate and the calculated slip angle both have positive values or both have negative values; and set, in response to detecting the outwardly headed state, a target accelerator operation amount so that a difference between a driving force on the front wheel caused by an output of the travel power source and an absolute value of a braking force on the front wheel caused by internal circulation torque of the transfer is reduced; and an information presentation device configured to present the driver with information regarding the target accelerator operation amount.

9. A driving assistance apparatus to be mounted on a vehicle, the vehicle comprising a transfer and a differential rotation limiting device, the transfer being configured to transmit a driving force generated by a travel power source in response to an accelerator operation to a front wheel driving device and a rear wheel driving device and to permit differential rotation between the front wheel driving device and the rear wheel driving device, the accelerator operation being performed by a driver who drives the vehicle, the front wheel driving device being configured to drive a front wheel, the rear wheel driving device being configured to drive a rear wheel, the differential rotation limiting device being configured to generate a limiting force that limits the differential rotation, the driving assistance apparatus comprising:

circuitry coupled to at least a yaw rate sensor configured to detect a yaw rate of the vehicle, a vehicle speed sensor configured to detect a vehicle speed, and a steering angle sensor configured to detect a steering angle, wherein the circuitry is configured to:

calculate a slip angle using at least the detected steering angle and the detected vehicle speed;

determine that the detected yaw rate has a positive value while the calculated slip angle has a negative value, or vice versa; and detect an inwardly headed state during a turning state in response to determining that the detected yaw rate has a positive value while the calculated slip angle has a negative value, or vice versa; and set, in response to detecting the inwardly headed state, a target accelerator operation amount so that reduces a difference between a driving force on the rear wheel caused by an output of the travel power source and an absolute value of a braking force on the rear wheel caused by internal circulation torque of the transfer is reduced; and an information presentation device configured to present the driver with information regarding the target accelerator operation amount.

* * * * *